March 18, 1941.  E. L. FONSECA  2,235,210
SELF-COMPENSATING THERMOSTATIC APPARATUS
Filed Jan. 5, 1933
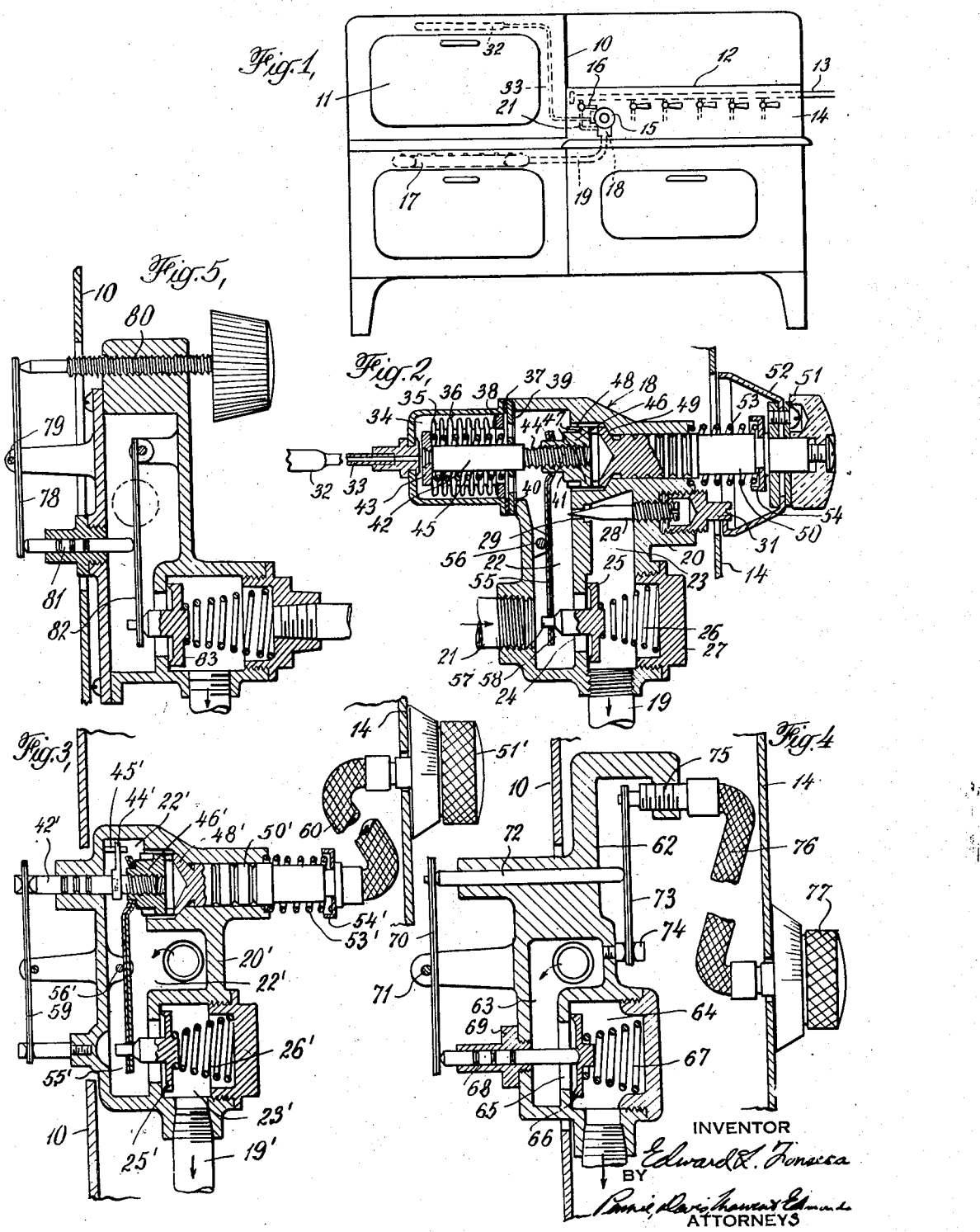
INVENTOR
Edward L. Fonseca
BY
ATTORNEYS Patented Mar. 18, 1941

2,235,210

UNITED STATES PATENT OFFICE 2,235,210

SELF-COMPENSATING THERMOSTATIC APPARATUS

Edward L. Fonseca, Newark, N. J., assignor to The Wilcolater Company, Newark, N. J., a corporation of Delaware Application January 5, 1933, Serial No. 650,255

9 Claims. (Cl. 236—15)

This invention relates to thermostatic apparatus particularly adapted for regulating the temperature within the oven of a gas range or the like with great accuracy regardless of the extraneous temperatures to which the thermostat is subjected as the result of the operation of the other burners of the range and which would otherwise render the operation of the thermostat inaccurate. Thermostatic apparatus of this nature is disclosed in my copending application, Serial No. 575,525, filed November 17, 1931, issued December 7, 1937, as Patent No. 2,101,735, and the present invention is concerned with the same subject matter.

As indicated in the aforementioned copending application, I may introduce the compensating thermostat at any point in the operating system of the heat regulating thermostat and the present invention is directed to the provision of modifications of the self compensating heat regulator disclosed in the said copending application.

In accordance with the invention, I utilize the compensating thermostat as an actuator for transmitting mechanical movements of adjustment or valve regulation as well as for providing the thermostatic compensating variations in the operating system of the heat regulating thermostat in accordance with extraneous temperatures. To this end the compensating thermostat is preferably a bi-metallic strip which may serve as a motion transmitting lever between the manual adjusting means and the valve or heat regulating thermostat, or between the heat regulating thermostat and the valve, or as an element in the manual adjusting train including the heat regulating thermostat, or the like. In any of these positions the compensating thermostat responds to extraneous temperatures in proportion to the degree thereof to actuate the valve, the heat regulating thermostat, the adjusting means, or a combination of these, the amount which is necessary to compensate for the disturbing effects of the extraneous temperatures on the heat regulating thermostat, whereby the latter is, in effect, insulated against these extraneous temperatures without the use of actual insulation.

Also in accordance with the invention, I may arrange the apparatus to compensate for the drop in pressure of the fuel flowing to the oven burner as the result of lighting of one or more of the exterior burners. In order to accomplish this additional compensating effect, I cause the compensating thermostat to overcompensate in response to temperature increases to which the heat regulating thermostat is subjected as the result of lighting of exterior burners. This overcompensating action of the compensating thermostat causes it to open the oven burner valve wider to compensate for the fuel pressure drop caused by the lighting of the exterior burner. This overcompensation is additional to the direct compensation, which insures no change in position of the valve as the result of the effect of extraneous temperatures on the oven thermostat, but does not compensate for the drop in fuel pressure resulting from the turning on of one or more of the outside burners producing the extraneous temperatures. The compensating thermostat may be rendered overcompensating simply by making it slightly thinner, if a bi-metallic strip is employed, or otherwise procuring the same effect if other forms of thermostats are employed.

It will be seen that the self-compensating thermostatic apparatus of this invention may be mounted anywhere on any kind of a range or stove, whether or not the oven is insulated, without regard to or consideration of the effects of extraneous temperatures on the oven heat regulating thermostat. Accordingly, the apparatus may be mounted on the low inside wall of the oven of the standard console or table top gas range in close proximity to the adjacent exterior cooking burner with the assurance that the heat emitted by the exterior burners, and the temperature fluctuations resulting from the turning on and off of the exterior burners, will not affect the operation of the heat regulating thermostat. These advantages also simplify installation of the apparatus on the range since it can be placed directly in the fuel supply line and a flexible shaft led thereto from the manual adjusting means which may be placed in the most convenient place, whereby the usual labor, cost, time, and complications of placing the range in service are greatly reduced. Also, by arranging the compensating thermostat to overcompensate, the fuel pressure drop resulting from operation of the exterior burners is compensated for.

For a more complete understanding of the invention, reference may be made to the accompanying drawing, in which Figure 1 illustrates one way of mounting one form of the new self-compensating thermostatic apparatus on a gas range of the console type;

Figure 2 is a cross section through the apparatus shown in Figure 1, in which the heat regulating thermostat is a column of thermo-responsive fluid;

Figure 3 is a cross section through a modified form of the apparatus of Figures 1 and 2, which is distinctive in that the heat regulating thermostat is a bi-metallic element adjustable from a remote point by means of a flexible shaft; and Figures 4 and 5 illustrate cross sections through other modified forms of the invention.

Referring to Figure 1 of the drawing, the inner side wall 10 of the oven 11 of a conventional style of console range illustrated is only about six inches in height and while it is possible to mount the compact thermostatic control apparatus on this inner wall 10, the adjusting handle or other mechanism projecting outside of the wall lies directly above the exterior cooking burners 12 because of the low height of the wall and consequently the adjusting knob frequently becomes too hot to handle comfortably. Also, the projection of the mechanism of the control device is in the way of and is liable to be injured by cooking utensils moved around on the cooking burners 12 if the control device is mounted in the usual place on the side wall 10 of the oven 11. Furthermore, whether the control device is mounted in the usual place on the side wall 10 of the oven 11, above the exterior burners 12 as illustrated, or below them, it is subject to extraneous temperatures emitted by the exterior cooking burners 12 and the heat regulating thermostat of the device responds to this false extraneous heat to actuate the oven burner valve so that the temperature of the oven burner fluctuates and does not maintain the temperature of the oven at the degree pre-registered by the adjusting knob, and this is especially so when the exterior cooking burners are turned on and off during the operation of the oven, as is frequently the case.

The thermostatic apparatus of this invention permits practically any desired arrangement and Figure 1 illustrates an example of this feature, the apparatus being located beneath the fuel supply manifold 13 and the exterior burner top 12, and behind the front panel 14, so that in use all pipe connections are hidden and only the adjusting knob or dial 15 is visible in addition to the cocks for the several burners, including cock 16 of the oven burner 17, which is connected to the manifold 12 by pipe 19 through the thermostatic apparatus 18. The cooking top of the range is thus free of damageable obstructions.

In the form of thermostatic apparatus 18 illustrated in Figures 1 and 2, the valve body 20 may be suitably supported, such as by the supply pipe 21 leading from the oven fuel cock 16. The valve body 20 contains a fuel intake chamber 22, with which pipe 21 communicates and a fuel outlet chamber 23, with which outlet pipe 19 communicates. The inlet chamber 22 and the outlet chamber 23 are connected by passage 24 controlled by valve 25, which is normally urged toward closed position by a spring 26 seated at one end in cap 27. An adjustable needle valve 28 by-passes a small supply of gas from inlet chamber 22 through passage 29 controlled by the needle valve 28 into outlet chamber 23, so that the oven burner 17 is supplied with a small but continuous supply of gas when the cock 16 is open, even if the valve 25 is closed, in order that the oven burner 17 will not be extinguished unintentionally. Needle valve 28 is accessible for adjustment upon removal of cap 31.

Located within the oven at a point which is representative of the temperature thereof, is a bulb 32 which is connected by a capillary tube 33 to a chamber 34 formed between the exterior surface of flexible metal bellows 35 and the interior surface of cup 36, which is sealed by gasket 37 over an opening in the valve body 20 communicating with the fuel inlet chamber 22. The joint between the bellows 35 and the cup 36 is sealed by means of ring 38. A perforated disc 39 is interposed between the cup and the valve body 20, a gasket 40 being inserted between the disc 39 and the valve body 20 to seal the joint. The space 34 between bellows 35 and cup 36, the capillary tube 33 and the bulb 32 jointly form a continuous sealed column which contains a suitable thermo-responsive liquid having a high boiling point and negligible vapor pressure at the working temperatures to which it is subjected.

The disc 39 is perforated and also serves as a guide for a rod 42 secured at one end to the cap 43 of the bellows 35 and threaded at its other end 44. A spring 45 is interposed between the bellows cap 43 and the disc 39 and tends to keep the bellows 35 expanded and normally urges rod 42 to the left, as seen in Figure 2. A nut 46 is screwed on the threaded end 44 of rod 42 and is provided with lateral keys 47 which slide in corresponding slots or keyways in yoke 48 having a sealing conical seat 49 which prevents the escape of fuel at this point. Yoke 48 is formed on the end of shaft 50 projecting out of the valve body 20 and carrying at its free end a knob 51 having a scale 52 which cooperates with a suitable index on the front panel 14 or other surface of the range. A spring 53, interposed between valve body 20 and a collar 54 on shaft 50, holds sealing cone 49 securely against its seat and also serves to lock knob 51 in any adjusted position. It will be seen that rotation of the knob causes nut 46 to screw on or off of the threaded end 44 of rod 42, so that the position thereof varies with respect to the bellows 35.

Rockingly seated on nut 46 and bifurcated to accommodate the reduced end of the latter, is a bi-metallic compensating thermostat 55 pivoted adjacent its center on fulcrum 56 and having an opening in its opposite end for the reception of the reduced end 57 of the stem 58 of valve 25. The bifurcated end of the compensating thermostat 55 is formed into a V-shape which rocks with a knife blade action on the shoulder 41 of nut 46. Thus, the compensating thermostat 55 not only acts as a thermostat but also as a motion-transmitting lever between the bellows 35 and the valve 25, the opposing springs 45 and 26 holding the compensating thermostat 55 firmly and steadily in any adjusted position. For example, as the bellows 35 is compressed in response to the expansion of the thermo-responsive liquid column in accordance with an increase in the temperature in the oven 11, rod 42 is moved to the right as seen in Figure 2 to actuate nut 46 so that compensating thermostat 55 pivots about its fulcrum 56 to permit spring 26 to move valve 25 toward closed position. Conversely, as the thermo-responsive liquid column contracts in response to a decrease in temperature in the oven 11, rod 42 moves toward the left, as seen in Figure 2, under the influence of spring 45, so that compensating thermostat 55 is moved in a counter-clockwise direction about fulcrum 56 to open valve 25. Adjustment of knob 51 regulates valve 25 because nut 46 is either advanced or retracted along rod 42 and in turn transmits motion through compensating thermostat 55 to valve 25.

When the oven 11 is in operation and none of the exterior burners 12 is in use to influence the thermo-responsive liquid and there is no unusual exterior temperature condition, the thermostatic apparatus operates in a manner readily understood, compensating thermostat 55 acting simply as a motion-transmitting means between the bellows 35 and the valve 25 in the manner described. However, should the user of the range turn on one of the exterior burners 12, the heat emitted thereby by radiation, conduction, or convection, would influence the thermo-responsive liquid column because of the proximity of the latter to the source of the extraneous heat. The thermo-responsive liquid column would accordingly respond to this extraneous heat by expanding to move valve 25 toward closed position, so that the fuel supply to the oven burner would ordinarily be reduced unnecessarily since this change in the supply of fuel was not caused by any change in oven temperature. Accordingly, the temperature of the oven would not be constant and this condition would be aggravated by the turning on of additional burners and also by turning burners off, in a manner readily understood. However, the compensating thermostat 55 responds to these extraneous temperatures by flexing proportionately so that whenever the thermostatic column expands in response to these extraneous temperatures and tends to move valve 25 toward closed position, the compensating thermostat 55 flexes in the same direction in response to the extraneous temperature to hold valve 25 in the proper position, since it opens the valve 25 the same degree that the thermo-responsive fluid column closes the valve in response to these extraneous temperatures. Conversely, any reduction in temperature, to which the thermostatic fluid column would ordinarily respond by contracting to open valve 25 further, is nullified by the compensating thermostat 55, which accordingly flexes an equal amount in the same direction. The compensating thermostat 55 also responds to changes in extraneous temperatures other than those caused by the turning on or off of the exterior cooking burners 12, so that the heat regulating thermostat regulates the fuel supply only in response to the temperature conditions in the oven.

Figure 3 illustrates a modified form of the self-compensating thermostat of Figure 2 in that the thermo-responsive liquid column is replaced by a bi-metallic thermostatic strip 59, which is anchored at one end to the valve casing 20' and is connected at its other end to a rod 42' which is slidably mounted through the wall of the casing 20' and projects into the fuel inlet chamber 22'. The inner end of rod 42' is threaded in nut 46', which is slidably mounted in the yoke 48' of shaft 50', adjustable by a flexible shaft 60 rotated by knob 51'. A lever 44' fixed on rod 42' and slidable on fixed pin 45' holds rod 42' against rotation. A coil spring 53' between valve casing 20' and collar 54' locks shaft 50' in any position to which it has been adjusted by knob 51' and also serves to seal the conical portion of yoke 48' in its seat against the escape of fuel. As in the arrangement of Figure 2, the compensating thermostat 55' is connected at one end to nut 46' and at the other end to valve 25', being pivoted at its center on fulcrum 56'.

The inlet chamber 22' of the valve casing 20' is connected to the source of fuel supply in the usual way and the outlet chamber 23' is connected by pipe 19' to the burner of the oven. In order to be responsive to the temperature within the oven the heat regulating thermostat 59 is preferably introduced through an opening in the wall 10 of the oven 11, and in order to be readily accessible, the adjusting knob 51' is preferably placed at a convenient point on panel 14 remote from the valve body 20'.

In operation, the heat regulating thermostat 59 responds to increases in temperature by flexing inwardly to move rod 42' to the right, as seen in Figure 3, and, through compensating thermostat 55' as the actuating means, permits spring 26' to move valve 25' toward closed position. In response to decreases in temperature the heat regulating thermostat 59 releases rod 42', so that the latter is moved to the left, as seen in Figure 3, so that compensating thermostat 55' is moved in a counter-clockwise direction about its fulcrum 56' to move valve 25' toward open position. In the event that any of the exterior cooking burners 12 is turned on, the compensating thermostat 55' flexes in response to the resulting extraneous heat so as to nullify the additional movement imparted to the heat regulating thermostat 59 by this extraneous heat, so that the position of valve 25' is not changed and the oven is maintained at constant temperature. Thus, the compensating thermostat 55' in this arrangement, as in the arrangement of Figure 2, in effect insulates the heat regulating thermostat from extraneous temperatures.

A somewhat different arrangement is illustrated in Figure 4. The valve body 62 is mounted on the oven wall 10 with a portion projecting therethrough, so as to be subjected to the temperature within the oven. The fuel inlet chamber 63 of the valve body 62 is supplied with fuel from the manifold 13 in the usual way and communicates with outlet chamber 64 through passage 65 which is controlled by valve 66 normally urged toward closed position by spring 67. A push rod 68 engages the valve 66 and is slidably mounted in a bushing 69 secured to valve body 62. The outer end of push rod 68 engages one end of heat regulating bi-metallic thermostat 70 which is fulcrumed at 71 and engages with its opposite end the actuating rod 72, which is slidable through the valve body 62 and engages compensating bi-metallic thermostat 73 at a point between its fixed end 74 and its opposite end, which is engaged by a screw 75 rotatable by a flexible shaft 76 connected to adjusting knob 77. It will be noted that the heat regulating thermostat 70 lies within the oven wall 10 and the compensating thermostat 73 lies outside of it.

The knob 77 may be placed at any convenient point such as on the panel 14 and manipulation thereof by the user of the range is communicated by flexible shaft 76 to screw 75, which in turn moves compensating thermostat 73 about its pivot 74 and this thermostat, by means of actuating rod 72, pivots heat regulating thermostat 70 about its fulcrum 71 to move valve 66 to its initial open position. The heat regulating thermostat 70 maintains the temperature of the oven to the degree pre-registered by knob 77. In the event that extraneous heats are set up by operation of the exterior cooking burners 12, the compensating thermostat 73 responds by flexing to the left, as seen in Figure 4, to compensate for the equivalent flexure of heat regulating thermostat 70 to the right in response to the extraneous heats. Thus, the false response of the thermostat 70 which would ordinarily result in movement of valve 66 toward closed position, is nullified by the action of compensating thermostat 74.

Figure 5 illustrates still another form of the invention in which the heat regulating thermostat 78 which lies within the wall 10 of the oven, is adjustable about its fulcrum 79 by adjusting screw 80, in accordance with the desired oven temperatures, and actuates push rod 81 to cause compensating thermostat 82 to open valve 83. The heat regulating thermostat 78 responds to variations in the temperature of the oven to actuate valve 83 through the operating train just described to maintain the oven at the proper predetermined temperature set by adjusting screw 80. The compensating thermostat 82, in response to extraneous heats, flexes to the right, as seen in Figure 5, to compensate for the corresponding flexure of the heat regulating thermostat 78 to the left in response to these extraneous heats.

Any of the modifications of the invention may be arranged to compensate for the drop in fuel pressure, which accompanies the increase in extraneous temperature resulting from the turning on of one or more of the exterior burners 12 located between the supply and the oven burner, by making the compensating thermostats 55, 55′, 73 or 82 slightly thinner, so that they will overcompensate, with the result that instead of only compensating for the effects on the heat regulating thermostat of the increase in extraneous temperatures, the corresponding oven fuel valve 25, 25′, 66 or 83 is opened wider to supply a sufficiently greater volume of the fuel at lower pressure as is necessary to compensate for its drop in pressure. Other equivalent ways of causing the compensating thermostat to overcompensate may be employed with equal facility, whether or not the thermostat is of the bimetallic strip type or some other equivalent form.

It will be seen that in each of the modifications of the invention illustrated and described, all effects of extraneous or local heats from any cause are compensated for by the compensating thermostat, which has been previously calibrated accordingly. This self-compensation of the apparatus permits the mounting thereof anywhere on any range without regard to or consideration of the effects of extraneous temperatures thereon. It will also be seen that in each of the arrangements illustrated and described the compensating thermostat acts as a motion-transmitting means as well as a thermostat and thus may be substituted in place of the corresponding element in standard heat regulating apparatus to convert it into a self-compensating device without requiring reconstruction or any extra parts. The several arrangements illustrated and described herein also indicate that the compensating thermostat may be placed in practically any position with regard to the valve, the adjusting means, or the heat regulating thermostat, and although particular arrangements and structures have been illustrated and described, it is to be understood that the invention is not limited thereby, but is susceptible of various changes of form and detail within its scope.

I claim:

1. In a thermostatic apparatus for controlling the temperature of a gas range oven, the combination of a gas supply valve for the oven burner, a thermostat responsive to the temperature of the oven, a thermostatic lever pivoted intermediate its ends and connected at one end to the thermostat and at the other end to the valve and responsive to extraneous temperatures for modifying the setting of the valve, and means for adjusting the thermostatic lever about its pivot independently of the thermostat.

2. In a thermostatic regulator for the heater of the oven of a range, the combination of means for controlling the heater, a thermostat responsive to the temperature of the oven, an operative connection between the thermostat and the means including a second thermostat responsive to temperatures outside the oven for modifying the actuation of the means by the first thermostat, and means for adjusting the second thermostat to vary the relation between said means and the first thermostat.

3. In a thermostatic regulator for the heater of the oven of a range, the combination of means for controlling the heater, a thermostat responsive to the temperature of the oven, operative connections between the thermostat and the means including a bimetallic lever responsive to temperatures extraneous to the oven for modifying the actuation of the means by the thermostat, and a handle for adjusting the lever to vary the relation between said means and the thermostat.

4. In combination with a range having a heating device in the oven and an exterior heating device adjacent the oven, an element for controlling the supply of a heating medium to the oven heating device, a thermostat having a thermo-sensitive part in the oven for controlling the element in accordance with temperature changes in the oven, a connection between the thermostat and said element including a second thermostat outside of the oven and responsive with the first thermostat to heat emitted by the exterior heating device and operable to modify the setting of the element to compensate for the effect of the heat of the exterior heating device on the first thermostat, and a handle for actuating the first thermostat and thereby adjusting the control element through said thermostats.

5. In a thermostatic apparatus for controlling the temperature of an oven, the combination of a casing, a rod extending through the front of the casing and rotatable therein, a thermostat at the rear end of the casing in axial alignment with the rod, an actuator in the casing between the rod and thermostat and operatively connected to the thermostat and adjustable relative thereto by rotation of the rod, a bimetallic lever pivoted intermediate its ends in the casing and extending laterally from the axis of the rod, one end of the lever being engaged by the actuator, and a control element offset laterally from the axis of the rod and connected to the opposite end of the lever, the lever being operable to transmit motion of the first thermostat and actuator to the control element and being adjustable by rotation of the rod to change the setting of the control element.

6. In a thermostatic apparatus for controlling the temperature of an oven, the combination of a device through which a medium for heating the oven is supplied, a plurality of thermostats operatively connected to the device, one of said thermostats being responsive to the temperature of the oven and acting through said device to shut down the supply of the heating medium upon a rise of temperature, and the other thermostat being responsive to temperature outside the oven and acting through said device to increase the supply of heating medium upon a rise of temperature, one of said thermostats being a bimetallic element connected at a point intermediate its ends to the device, and a handle operatively connected to one of the thermostats for adjusting said thermostats and the device as a unit.

7. In a thermostatic apparatus for controlling the temperature of an oven, the combination of a device through which a medium for heating the oven is supplied, a plurality of thermostats operatively connected in series to the device, one of said thermostats being responsive to temperature changes in the oven and acting through said device to shut down the supply of heating medium upon a rise in temperature, and the other thermostat being responsive to temperature changes outside the oven and acting through said device to increase the supply of heating medium upon a rise in temperature, said last thermostat being a bimetallic element connected at a point intermediate its ends to said device, and a handle operatively connected to at least one end of the second thermostat for adjusting the second thermostat and said device as a unit.

8. In a thermostatic apparatus for controlling the temperature in an oven, or the like, having a heating device, the combination of an element for controlling the supply of a heating medium to said device, a thermostat responsive to the temperature of the oven, a thermostatic lever pivoted intermediate its ends and connected at one end to the thermostat and at the other end to said control element and responsive to extraneous temperatures for modifying the setting of the control element, and means for adjusting the thermostatic lever about its pivot independently of the thermostat.

9. In combination with a cooking range having a heater in the oven and an exterior heater adjacent the oven, a casing mounted adjacent the oven wall and having a device for controlling the supply of a heating medium to the oven heater, a thermostat on the casing having a part projecting through the wall of the oven and responsive to the oven temperature and acting through said device to reduce the supply of heat upon a rise in the oven temperature, a second thermostat on the casing located outside of the oven and connected to the first thermostat and through which motion from the first thermostat is transmitted to the control device, the second thermostat being operable to compensate for the effect of the heat of the exterior heater on the first thermostat and acting through said device to increase the heat supply upon a rise in temperature due to the exterior heater, and a handle connected to one of the thermostats for adjusting both thermostats and the control device as a unit, said thermostats and adjusting means jointly constituting the control means for said device.

EDWARD L. FONSECA.